Figure 1:
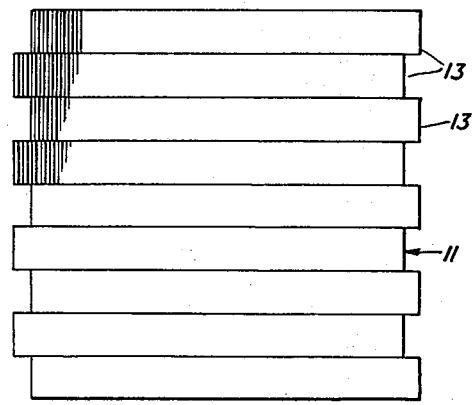

Feb. 5, 1963  F. R. BELL  3,076,753
NUCLEAR REACTOR CORE
Filed March 16, 1960  2 Sheets-Sheet 1

INVENTOR
FRANCIS R. BELL

BY
Watson, Cole, Grindle & Watson
ATTORNEYS

Feb. 5, 1963 — F. R. BELL — 3,076,753
NUCLEAR REACTOR CORE
Filed March 16, 1960 — 2 Sheets-Sheet 2

INVENTOR
FRANCIS R. BELL

BY
Watson, Cole, Grindle & Watson
ATTORNEYS

United States Patent Office 3,076,753
Patented Feb. 5, 1963

3,076,753
NUCLEAR REACTOR CORE
Francis Robert Bell, London, England, assignor to The De Havilland Engine Company Limited, Leavesden, England, a company of Great Britain
Filed Mar. 16, 1960, Ser. No. 15,458
Claims priority, application Great Britain Mar. 16, 1959
5 Claims. (Cl. 204—193.2)

This invention relates to nuclear reactor cores and one object is to enable cores to be made which are not very liable to fracture under transverse loading, for example such as could be experienced if the reactor were in a ship.

According to one aspect of the present invention a nuclear reactor core is composed of a number of elements of solid moderator material fitted together, the core being apertured for the accommodation of nuclear fuel and possibly also apertured to provide paths for coolant. Conveniently the elements are all alike.

Each element may be a nuclear reactor core element according to a second aspect of the invention, being of solid moderator material apertured for the accommodation of nuclear fuel and having an external shape enabling it to be stacked with other similar elements to form layers of elements with the surfaces of adjacent elements fitting and in contact with each other and to form a multi-layer reactor core of which adjacent layer surfaces fit and are in contact with each other.

The core elements may have two equal parallel faces and a uniform cross-section parallel with these faces. Preferably the cross-section is other than rectangular; for example it may be of generally hexagonal shape.

Each side of such a generally hexagonal section is preferably uneven with indentations and corresponding protrusions so that the elements can be fitted together with the protrusions in one side of each element in indentations in the mating side of another.

The core elements may be apertured to provide the paths for coolant and in a preferred form of the invention the element has several fuel apertures extending from one of the parallel faces to the other. The coolant apertures are preferably uniformly spaced apart, being at the apices of a series of equilateral triangles having common sides. The fuel apertures may be similarly arranged and in addition, each fuel aperture may have serrations extending parallel with the axis of the aperture or may be helically grooved in accordance with the pellets of fuel to be inserted as described in U.S. application No. 15,459.

In the assembled core conveniently each layer of elements is slightly laterally displaced in relation to adjacent layers so that the outlines of individual elements are not in line but so that the coolant apertures are in line with apertures in adjacent layers.

The elements in one layer may be located laterally in relation to those in an adjacent layer by keys partly in a fuel aperture in an element in one layer and partly in an aligned fuel aperture in an element in the adjacent layer.

The invention may be carried into practice in various ways and one embodiment will now be briefly described by way of example.

Figure 2:
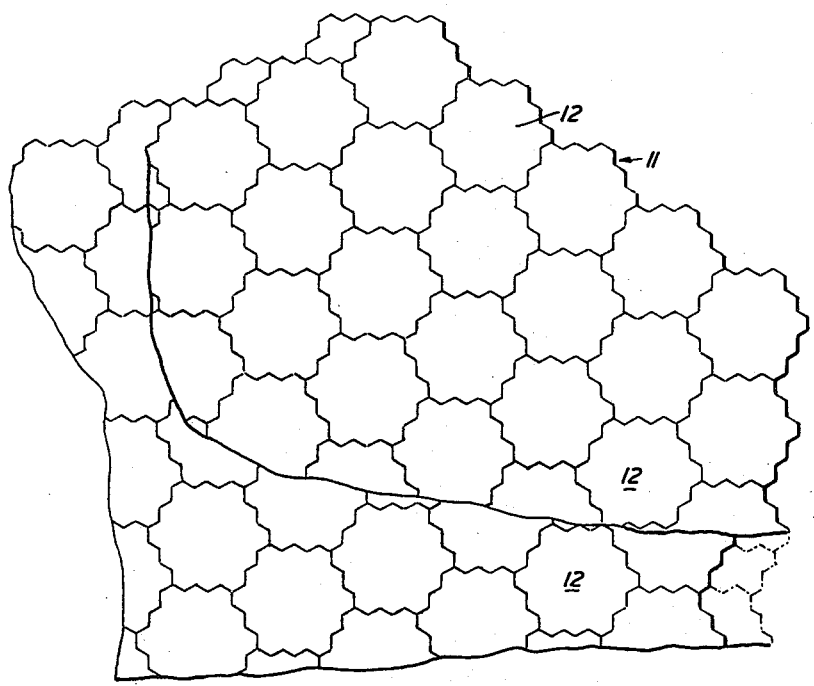
Figure 3:
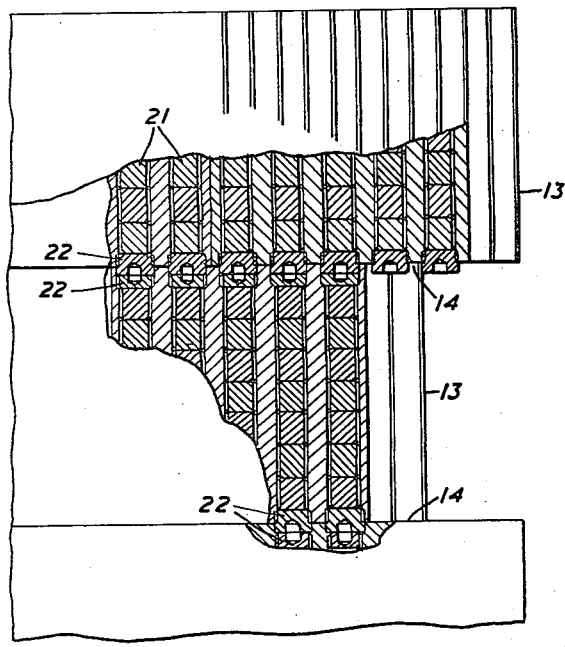
Figure 4:
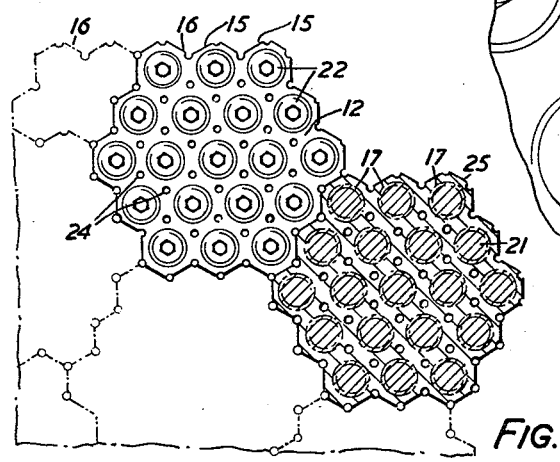
Figure 5:
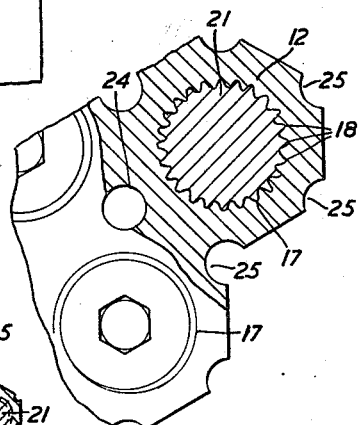

Reference will be made to the accompanying drawings in which:

FIGURE 1 is an elevation of a reactor core built up from nine layers of elements of moderator material, FIGURE 2 is a scrap plan view of the core of FIGURE 1 to an increased scale with a part of the top layer of elements removed, FIGURE 3 is a scrap elevation partly in section of the reactor core to a further increased scale, FIGURE 4 is a plan view partly in section corresponding to FIGURE 3 and FIGURE 5 is a plan view to an increased scale of a detail of FIGURE 4 partly in section showing one form which the fuel pellets may take.

The nuclear reactor core 11 is composed of a large number of identical individual elements 12 of solid moderator material, for example graphite, beryllia or graphite-beryllia. There are a large number of individual elements in each of nine parallel layers 12.

Each individual element 12 has two equal opposed parallel flat surfaces 14 and a constant cross-section parallel with these surfaces. These surfaces and the cross-section are of generally hexagonal shape although the sides of the approximate hexagons are not straight but are of zig-zag shape running alternately at an angle of 30° to one side of the nominal straight side and 30° to the other side as can be seen from FIGURE 2. All the straight portions are of equal length so that the side of the section is of regular toothed formation. It will be apparent that when two of these elements are brought side by side the protrusions 15 on one will fit the indentations 16 in the other and, by virtue of the fact that the cross-section of each is approximately hexagonal, a third element will fit into the angle formed between the adjacent sides of the two elements in contact so that many elements can be placed together to form a continuous layer as large as is desired, again as shown in FIGURE 2.

Since all the elements are of equal size each layer 13 will have flat upper and lower surfaces and other layers can be built up on top.

Each element, which may be about 8" deep and about the same across the diagonal of the hexagon, has nineteen regularly arranged fuel apertures 17 (FIGURES 4 and 5) consisting merely of bores extending from one parallel face 14 to the other perpendicularly to these faces. These may be about 1" in diameter and may be splined parallel with the axis (as shown in FIGURE 5 at 18) or helically grooved or otherwise formed to suit any particular pellets of nuclear fuel. This is described in U.S. application No. 15,459.

The pellets of nuclear fuel 21 can be stacked in the apertures 17 and these are then closed by graphite plugs 22 at top and bottom. The plug at one end has its outer face some distance below the face of the core element to form a key socket and the plug at the other end protrudes from the face of the core element to form a spigot which can be keyed into the socket in the mating face of an element in the next layer.

Regularly arranged between the fuel apertures 17 and at the corners of regular hexagons with common sides are parallel bores 24 (FIGURES 4 and 5) of about ⅜" diameter through which fluid coolant can be passed during operation of the reactor core. The regular arrangement of the fuel aperture 17 and coolant aperture 24 ensures that many at least of the coolant apertures will be aligned with coolant apertures in the next layers so that there will be continuous paths for the flow of coolant through the whole reactor core 11.

At the side surfaces of each element 12 at the crown of each protrusion 15 and the bottom of each indentation 16 the surface is fluted with flutes 25 of the same diameter as the coolant bores so that when the elements are assembled into a layer two corresponding flutes 25 will constitute an additional coolant aperture.

The successive layers 13 of the core are slightly laterally displaced relatively to each other as shown in FIGURE 2 so that the junctions between mating elements do not correspond in adjacent layers, and the whole core is held in assembly by some conventional framework (not shown).

The core made up in this way is much less likely to fracture under transverse loading than is a core of similar shape made from a single block of solid moderator material.

It will be apparent that the shape of element described is only one example of a shape which enables elements to be stacked with other similar elements with the surfaces of adjacent elements fitting and in contact with each other and also that other means than keys in the fuel apertures can be used to locate adjacent layers laterally in relation to each other.

What I claim as my invention and desire to secure by Letters Patent is:

1. A nuclear reactor core composed of a number of stacked horizontal layers, each made up of a number of identical elements of moderator material of equal height and of generally hexagonal cross-section, the elements in each layer being horizontally displaced in relation to those in the adjacent layers, each of the elements having holes containing nuclear fuel and separate bores for coolant, which extend parallel with the fuel holes, the coolant bores in the elements being regularly arranged at the corners of hexagons with common sides, and the coolant bores in different layers being aligned to define paths for the flow of coolant through the whole stack of layers, which paths are horizontally separated from the fuel holes.

2. A core as claimed in claim 1 in which each side of the section of each element is uneven with indentations and corresponding protrusions which mate intimately with the protrusions and indentations of the adjacent elements.

3. A reactor core as claimed in claim 2 wherein the fuel holes in the elements in different layers are also aligned to define continuous fuel chambers extending through all the layers.

4. A reactor core as claimed in claim 3 in which the surface of each fuel aperture has a number of parallel serrations extending between the parallel faces.

5. A reactor core as claimed in claim 3 in which the elements in adjacent layers are horizontally located in relation to each other by keys each partly in a fuel hole in an element in one layer and partly in a fuel hole in an element in an adjacent layer, there being several keys inter-connecting each element with each of the elements with which it is in contact in the adjacent layers.

References Cited in the file of this patent

UNITED STATES PATENTS

| | | |
|---|---|---|
| 2,708,656 | Fermi et al. | May 17, 1955 |
| 2,863,815 | Moore et al. | Dec. 9, 1958 |
| 2,929,768 | Mahlmeister | Mar. 22, 1960 |
| 2,983,663 | Bassett | May 9, 1961 |

FOREIGN PATENTS

| | | |
|---|---|---|
| 204,140 | Austria | June 25, 1959 |
| 782,888 | Great Britain | Sept. 11, 1957 |
| 1,175,779 | France | Nov. 17, 1958 |

OTHER REFERENCES

Larson: Nuclear Science and Engineering 4, 607–609 (1958).

Daniels: Nucleonics, March 1956, pp. 34–41.